United States Patent Office 2,844,424
Patented July 22, 1958

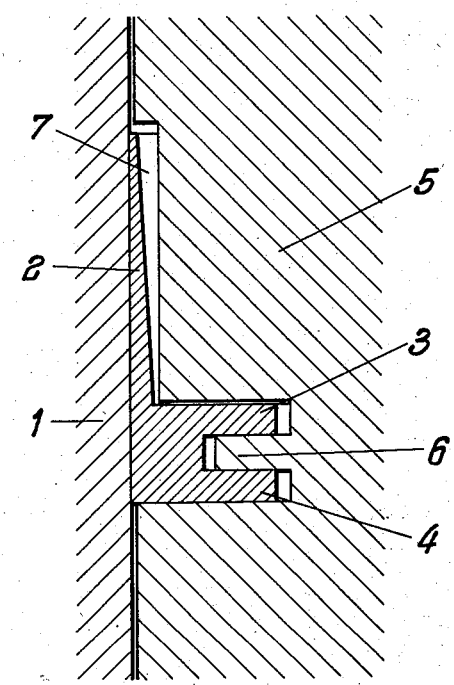

2,844,424

PISTON SEALING MEANS

Rolf Friedrich Goetze, Burscheid, near Cologne, Germany, assignor, by mesne assignments, to Rand-Goetze Corporation, Cleveland, Ohio, a corporation of Ohio Application February 13, 1957, Serial No. 639,991

Claims priority, application Germany February 20, 1956

4 Claims. (Cl. 309—44)

The invention relates to piston sealing means, for example for internal combustion engines, which consists of a piston ring which is L-shaped in cross-section, with a radially thin axial part which fits closely to the cylinder wall due to the pressure of the gas impinging on its inner surface, and a radial supporting part which fits into an annular groove of the piston.

In the known L-shaped piston rings, the radial supporting part is relatively thin. The rings therefore are not proof against flutter. They also tend to wear out quickly. Furthermore, since it is possible for the radial part to tilt within the groove in the piston, a close fit of the L-shaped ring against the cylinder wall is prevented.

Other L-shaped piston rings are known in which the supporting part is more solidly constructed and substantially square in cross-section. But the increased stiffness of the supporting part makes the axial part less flexible. In addition piston rings of this construction do not provide an adequate seal at the back of the supporting part, which is aggravated by the fact that the danger of the gases being blown past that part is particularly great with L-shaped piston rings, because the gases enter behind the thin axial arm of the ring, and are there compressed in a direction which facilities the blowing past of the gases. The invention is based on the idea that the advantages of the known L-shaped piston rings, namely their high degree of flexibility and close contact with the cylinder and therefore high efficiency of sealing, which are of particular importance in very fast-running engines, can be obtained without the previously mentioned disadvantages, by providing, in accordance with the invention, the radially directed supporting part of the piston ring on its inner periphery with two or more annular projections which engage in suitable annular grooves in the manner of a labyrinth packing. This not only increases the flexibility of the supporting ring and with it the close contact of the axial part with the cylinder wall but also decidedly improves the sealing effect at the back of the supporting ring. Finally, with this construction the heat transmission between piston and piston ring, as well as between piston ring and cylinder is also improved.

In the known piston rings which are provided on their inner surface with annular projections, these projections engage like teeth in corresponding annular grooves in the piston. But these rings are not L-shaped piston rings with a thin axial part on whose inner side the combustion gases impinge, but they are rings of substantially rectangular or square cross-section, which fit much less closely to the wall of the cylinder. Consequently, the sealing effect is less and as a result of this, the pressure of the combustion gases is uniformly distributed and not, as in the present invention, almost exclusively confined to the inner peripheral surface of the piston ring.

The axial part of the new piston ring may be relatively long. But in order to make as close contact as possible with the cylinder wall it should be thin in a radial direction. The radially directed ring parts, that is, the supporting ring with its inward projections, can be as wide as desired in a radial direction. Also its thickness in an axial direction may be as desired, but it is of advantage to make it only thick enough to cause the axial part to press against the cylinder wall and to prevent damage to the grooves in the piston.

In order to increase the flexibility and reduce the weight, the axial part may taper throughout its length towards its free end. In other words, such axial or flange part of the ring which contacts the surface of the cylinder wall may be described as conical in configuration. The radially thin axial part can easily adapt itself to the irregularities of the cylinder walls caused by heat and wear. The ring cannot tilt because the plurality of the radial or supporting parts gives a firm support. Since the axial part is mounted on several supporting parts, the stress on the walls of the piston grooves due to the reciprocating masses is reduced, because supporting parts of very small axial thickness can be used.

The piston ring of the invention is mainly used to act as a seal against combustion gases, and is therefore fitted with its axial part directed towards the combustion chamber. But it can also with advantage be used as an oil-stripping ring with the axial part directed towards the crankshaft. It can be made of light metal, steel or synthetic material. It is of advantage to have the piston set back from its main outer surface in the region of the axial part. The regions of the piston sleeve between the radial parts can be set back from the working surface of the piston, or even from the above retracted part of the piston.

The drawing illustrates a constructional example of a piston seal in accordance with the invention.

The piston ring consists of an axial part 2 which fits closely against the wall of the cylinder 1, and the radially projecting parts 3, 4. The radial parts are disposed in corresponding grooves in the piston 5. The part 6 of the piston between the two radial parts 3, 4 is set back from the main piston surface, so that radial movement of the piston ring is possible. The axial part 2 of the piston ring lies in the recess 7 with sufficient clearance to enable gases to enter between the piston and the back of the ring and exert additional pressure which presses the axial part against the cylinder. The gases are prevented from being blown past the ring by the labyrinth-like seal which is effected by the radial projections 3, 4 which engage in grooves in the piston and the part 6 of the piston between them.

I claim:

1. A piston packing primarily adapted for use upon a cylinder-engaging piston of an internal combustion engine and comprising a piston ring having an L-shape configuration in cross section, annular ring receiving grooves in said piston, said ring including a thin axial part adapted to engage the wall of said cylinder and a radially extending carrier part provided at its inner circumference with at least two annular projections adapted to seat in said grooves, said grooves and said projections forming a labyrinth-like packing preventing passage of combustion gases therethrough, said axial part being tapered substantially its full length toward its free end and being of a material and proportion to flex upon the application of pressure to the inner side thereof.

2. A piston packing primarily adapted for use upon a cylinder-engaging piston of an internal combustion engine and comprising a piston ring having an L-shape configuration in cross section, annular ring receiving grooves in said piston, said ring including a relatively thin and flexible axial part adapted to engage the wall of said cylinder and a radially extending carrier part provided at its inner circumference with at least two annular projections adapted to seat in said grooves, said grooves and said projections forming a labyrinth-like packing preventing passage of combustion gases therethrough, said axial part being of conical configuration throughout its length and being of a material and proportion to flex upon the application of pressure to the inner side thereof.

3. A piston packing primarily adapted for use upon a cylinder-engaging piston of an internal combustion engine and comprising a piston ring having an L-shape configuration in cross section, annular ring receiving grooves in said piston, said ring including a thin axial part adapted to engage the wall of said cylinder and a radially extending carrier part provided at its inner circumference with at least two annular projections adapted to seat in said grooves, said grooves and said projections forming a labyrinth-like packing preventing passage of combustion gases therethrough, said axial part being tapered substantially its full length toward its free end and being of a material and proportion to flex upon the application of pressures to the inner side thereof, said piston being of reduced dimension at the portion thereof opposite said axial part thereby facilitating the passage of combustion gases to the inner side of said axial part.

4. A piston ring primarily adapted for use upon a cylinder-engaging piston of an internal combustion engine and having an L-shape configuration in cross section, annular ring receiving grooves in said piston, said ring including a thin, upstanding axial part having a cylinder wall engaging face and a radially extending lower portion provided at its inner circumference with at least two annular projections adapted to seat in said grooves, the clearance between said grooves and said projections forming a tortuous course preventing the passage of combustion gases therethrough, said axial part being tapered substantially its full length toward its free end and being of a material and proportion to flex upon the application of gaseous pressures to the inner side thereof.

References Cited in the file of this patent

FOREIGN PATENTS 739,616    France _____ Jan. 14, 1933